United States Patent
Seok et al.

(10) Patent No.: US 8,767,600 B2
(45) Date of Patent: Jul. 1, 2014

(54) PROCEDURE FOR A POWER SAVE MODE IN A DIRECT LINK SETUP WIRELESS NETWORK

(75) Inventors: Yongho Seok, Anyang-si (KR); Jae Young Lee, Anyang-si (KR); Andrey I. Lyakhov, Anyang-si (KR); Alexsander A. Safonov, Anyang-si (KR)

(73) Assignee: LG Electronics Inc., Seoul (KR)

( * ) Notice: Subject to any disclaimer, the term of this patent is extended or adjusted under 35 U.S.C. 154(b) by 930 days.

(21) Appl. No.: 12/742,412

(22) PCT Filed: Nov. 12, 2008

(86) PCT No.: PCT/KR2008/006672
§ 371 (c)(1),
(2), (4) Date: May 11, 2010

(87) PCT Pub. No.: WO2009/064113
PCT Pub. Date: May 22, 2009

(65) Prior Publication Data
US 2010/0271995 A1    Oct. 28, 2010

(30) Foreign Application Priority Data
Nov. 12, 2007  (KR) .......................... 10-2007-0115142

(51) Int. Cl.
*G08C 17/00* (2006.01)
(52) U.S. Cl.
USPC ........................................................ 370/311
(58) Field of Classification Search
USPC ................. 370/310–350; 455/127.5, 574
See application file for complete search history.

(56) References Cited

U.S. PATENT DOCUMENTS

2005/0135305 A1* 6/2005 Wentink .................. 370/329
2007/0201410 A1 8/2007 Ginzburg
(Continued)

FOREIGN PATENT DOCUMENTS

JP       2006-93787 A      4/2006
WO   WO 2006/080084 A1   8/2006
(Continued)

OTHER PUBLICATIONS

Yoon, Hayoung et al. "iDLS: Inter-BSS Direct Link Setup in IEEE 802.11 WLANs" Communications and Information Technologies, 2007, ISCIT '07, IEEE International Symposium on, Oct. 17-19, 2007, pp. 1015-1020.

*Primary Examiner* — Andrew Chriss
*Assistant Examiner* — Kenan Cehic
(74) *Attorney, Agent, or Firm* — Birch, Stewart, Kolasch & Birch, LLP (57) ABSTRACT

There is provided a protocol for a power save mode (PSM) in a direct link setup wireless network. In an aspect of the present invention, among first and second stations between which a direct link has been set up, the first station trying to enter the PSM transmits a request message, including schedule information necessary for communication with the second station, to the second station. The second station transmits a response message, including a status code indicating whether it accepts the schedule information or not, to the first station in response to the request message. If the status code indicates that the second station accepts the schedule information, the first station may transmit an MPDU whose power save bit is set to '1' to the second station and then enter the PSM. However, if the status code indicates unacceptability, modified schedule information may be included in the response message.

6 Claims, 8 Drawing Sheets

(56) References Cited

U.S. PATENT DOCUMENTS

2007/0253391 A1* 11/2007 Shao et al. .................. 370/338
2007/0254657 A1 11/2007 Satoh et al.

FOREIGN PATENT DOCUMENTS

| WO | WO 2007/055993 A1 | 5/2007 |
| WO | WO 2007/068103 A1 | 6/2007 |

* cited by examiner

| Order | Information |
|---|---|
| 1 | Link Identifier |
| 2 | Association Request frame body |
| 3 | Dialog Token |
| 4 | RSNIE_I |
| 5 | SMK Message 1 FTIE |
| 6 | QoS Capability |

Fig. 4

| Element ID (46) | Length (1) | QoS Info |
|---|---|---|

Octets: 1  1  1

| Element ID | Length | Capabilities |
|---|---|---|
| 1 | 1 | n |

Octets:

Fig. 7

| Order | Information |
|---|---|
| 1 | Link Identifier |
| 2 | Status Code |
| 3 | Association Request frame body |
| 4 | Dialog Token |
| 5 | RSNIE_P |
| 6 | SMK Message 2 FTIE |
| 7 | QoS Capability |

Fig. 13

PROCEDURE FOR A POWER SAVE MODE IN A DIRECT LINK SETUP WIRELESS NETWORK

TECHNICAL FIELD

The present invention relates to a wireless local area network (WLAN), and more particularly, to a power save mode (PSM) in a direct link setup (DLS) wireless network.

BACKGROUND ART

With the development of information communication technology, a variety of wireless communication technologies are developing. Among them, WLAN is technology, enabling wireless access to an Internet at specific service providing areas, such as homes, companies or airplanes, using portable terminals, such as a personal digital assistant (PDA), a laptop computer and a portable multimedia player (PMP) on the basis of radio frequency technology.

Recently, as the spread of equipment related to WLAN is increasing, users who use portable terminals, such as laptop computers, can process their tasks through improved mobility. For example, users can move their laptop computers from their desks to the conference rooms and participate in a conference. Even in this case, they can fetch data, etc. while keeping access to a local network. Users may also access an Internet through one or more modems or gateways included in their local networks although there is no wired connection. In a similar way, a person who goes on a business trip may access his e-mail account using his portable terminal without a special difficulty, read received e-mails or write e-mail, and send the written e-mails.

The WLAN technology in its early stages was to support the rate of 1~2 Mbps through frequency hopping, band spreading, infrared communication, etc. using the frequency of 2.4 GHz through IEEE 802.11. With the recent development of wireless communication technology, it can support a maximum rate of 54 Mbps by applying WLAN to orthogonal frequency division multiplexing (OFDM) technology, etc. In addition, In IEEE 802.11, wireless communication technologies for the improvement of Quality of Service (QoS), access point (AP) protocol compatibility, security enhancement, radio resource measurement, wireless access in vehicular environment, fast roaming, a mesh network, inter-working with external network, wireless network management, etc. have been developed and commercialized or are now developing.

In IEEE 802.11, a basic service set (BSS) refers to a collection of stations (STAs) that have realized successful synchronization. Further, a basic service area (BSA) refers to an area, including members constituting a BSS. The BSA may differ depending on the propagation characteristic of a radio medium, and has an unclear boundary a little. The BSS can be basically classified into two configurations, an independent BSS (IBSS) and an infra-structured BSS. The former constitutes a self-contained network, and refers to a BSS whose access to a distribution system (DS) is not allowed. The latter includes one or more APs, DSs, etc., and generally refers to a BSS in which an AP is employed in all communication processes, including communication between stations.

According to a WLAN communication procedure it its early stages, in the infra-structured BSS, it was necessarily required that data pass through an AP for data transmission, while not allowing the direct transmission of data between Non-AP STAs. However, in recent years, for improved efficiency of wireless communication, the infra-structured BSS supports DLS between Non-AP STAs. Accordingly, in a BSS supporting the QoS, that is, a Quality-of-Service basic service set (QBSS) consisting of a Quality-of-Service station (QSTA) and a Quality-of-Service access point (QAP), Non-AP STAs can set up a direct link and directly communicate with each other through the direct link without passing through a QAP.

DISCLOSURE OF INVENTION

Technical Problem

As described above, the existing DLS setup procedure assumes that a BSS is a QBSS that supports the QoS. In the QBSS, not only Non-AP STAs, but also APs are QAPs that support the QoS. However, in currently commercialized WLAN environment (for example, WLAN environment according to IEEE 802.11a/b/g, etc.), although Non-AP STAs are QSTAs that support the QoS, most APs are legacy APs that do not support the QoS. Consequently, there is a limit in which, in the currently commercialized WLAN environment, Non-AP STAs are unable to employ DLS service although they are QSTAs.

Tunneled direct link setup (TDLS) is a wireless communication protocol newly proposed in order to overcome the above limit. The TDLS protocol does not support the QoS, but enables QSTAs to set up a direct link even in the currently commercialized WLAN environment of IEEE 802.11a/b/g, etc. Accordingly, the TDLS protocol regulates an overall procedure of enabling QSTAs to set up a direct link even in a BSS, which is managed by a legacy AP. Further, a wireless network, supporting the TDLS procedure, is hereinafter called a TDLS wireless network.

Meanwhile, Non-AP STAs constituting a BSS is operated in one of two kinds of power management modes, that is, an active mode (AM) and a PSM. Non-AP STAs are generally portable devices belonging to users and, therefore, the presumption may be that the Non-AP STAs supports the PSM so that power can be managed efficiently. In this case, it is also required to transmit data, management frames, etc. to an STA that operates in the PSM. This is the same when the STA sets up a direct link to other Non-AP STA (hereinafter referred to as 'peer STA'). To this end, in the existing wireless communication network, for QSTAs in which a QAP operates in the PSM, a procedure of temporarily buffering data and transmitting the buffered data to the QSTAs is regulated.

A wireless communication protocol in which Non-AP STAs are permitted to operate in the PSM and frames are also surely transmitted to Non-AP STAs, operating in the PSM, is also necessary in a TDLS wireless network. However, in the TDLS wireless network, an AP is a legacy AP that does not support the QoS. Thus, the wireless communication protocol in which an AP must be necessarily a QAP, data should be buffered for an STA in which a QAP operates in the PSM, and a communication procedure between a QAP and an STA, which operates in the PSM, is regulated so as to transmit buffered frames cannot be applied to a TDLS wireless network without change.

Accordingly, an object to be solved by the present invention is to provide a procedure for a peer power save mode (PPSM) in a DLS network, which supports that a Non-AP STA, setting up a TDLS link to a peer Non-AP STA, operates in the PSM, thereby being capable of minimizing power consumption.

Another object to be solved by the present invention is to provide a procedure for a PPSM in a DLS network, which enables a Non-AP STA, setting up a TDLS link to a peer Non-AP STA, to operate in the PSM and at the same time, communicate with the peer Non-AP STA through the TDLS link.

Technical Solution

To achieve the above objects, in embodiments of the present invention, a PPSM is newly defined. The PPSM refers to a PSM in which, in the case in which the counterpart of a TDLS link, that is, a peer STA is a terminal supporting the PPSM, a corresponding STA is entered while remaining on the TDLS link. In this case, what an STA 'remains on a TDLS link' means that the STA enters a PSM while maintaining the TDLS link set up between the STA and a peer STA. Accordingly, the STA entering the PSM may enter the PSM without changing the receiving path of a frame to an AP path. After switching from the PSM to an active mode (AM) or waking at a scheduled time previously agreed between the STA and the peer STA, the STA can receive data, etc., which is transmitted by the peer STA, through the TDLS link.

A PPSM may be used by an STA (Non-AP STA) that supports TDLS. A STA may inform a counterpart STA of information related to a PPSM, for example, whether the STA itself supports the PPSM or not, etc. For example, an STA may inform a counterpart STA of capability information of a terminal, which is related to a PPSM, using a TDLS setup request frame and/or a TDLS setup response frame. More specifically, an information element for specifying the capability information of an STA may be used in the TDLS setup request frame or the TDLS setup response frame. For example, the information element may be a QoS information element or an extended capability information element.

A method in which an STA, supporting a peer PSM (PPSM), enters a PSM may be several. One of the methods is to employ power management information. For example, an STA that tries to enter a PSM may enter the PSM after sending a frame whose value, in which power management information indicates a PSM, for example, a power management bit is set to '1' to a peer STA of a TDLS link.

Further, an STA that tries to enter a PPSM may negotiate with the PPSM about the time when the STA switches to an active mode, a channel to be used and/or the like before entering the PPSM. To this end, the STA that tries to enter the PPSM may exchange a request message, including schedule information such as the time when it switches to an active mode (for example, a wakeup schedule), and a response message in response thereto with a peer STA. If an agreement on the schedule information is reached through the exchange of the request message and the response message, the STA switches to the active mode (AM) according to the schedule information, and may receive frames, etc. or communicate with the peer STA using a channel, etc. according to the schedule information.

In the case in which the peer STA accepts the schedule information (for example, a proposed wakeup schedule) included in the request message received from the STA, the peer STA may transmit a response message (for example, a PPSM response frame) including such an intension (for example, a status code '0') to the STA. The STA and the peer STA, which have transmitted or received the response message having the status code set to '0', may transmit or receive frames according to the proposed wakeup schedule.

If the peer STA does not accept the proposed schedule information, the peer STA may send a response message, including an appropriate status code to reject the corresponding schedule, to the STA. In this case, in the case in which the status code indicates 'wakeup schedule rejected but alternative schedule provided', schedule information, such as new wakeup schedule information which will replace the proposed schedule information, may be included in the response message.

The STA may enter the PSM by setting a power management bit of an approved medium access control (MAC) protocol data unit (MPDU), which is transmitted to the peer STA, to '1'. If at least one peer STA enters the PSM, both the peer STAs wake at scheduled wakeup times, and wake during a minimum duration or wakes until the end of a peer service period. Further, if both the peer STAs enter the active mode by setting a power management bit of an approved MPDU, which is transmitted to the peer STAs, to '0', the schedule information of the scheduled wakeup times, etc. is discarded. Further, any one of the peer STAs may update schedule information, such as a currently wakeup schedule, by sending a new request message (for example, a PPSM request frame) through a currently active path.

Advantageous Effects

In the embodiments of the present invention, a PPSM is newly defined in a TDLS wireless network. If the PPSM is employed, an STA, which has set up a TDLS link to a peer STA, maintains the TDLS link without a change, and therefore can enter a PSM even without changing a data reception path to an AP path. In this case, the STA can schedule a wakeup time, a channel to use and/or the like by exchanging a request message, including schedule information, and a response message in response thereto with the peer STA before entering the PSM.

Accordingly, an STA that has set up a TDLS link can minimize power consumption while operating in a PSM. Furthermore, an STA, which operates in a PSM, wakes only at a schedule time agreed with a peer STA, and can communicate with the peer STA. Accordingly, the efficiency of communication can also be improved.

MODE FOR THE INVENTION

Hereinafter, the present invention will be described in detail in connection with embodiments with reference to the accompanying drawings.

In a TDLS wireless network to which the embodiments of the present invention are applicable, even Non-AP STAs, which are associated with a legacy AP, may set up a TDLS link, that is, a direct link mutually and also terminate a setup TDLS link. In order for any STA to set up or terminate a TDLS link to a counterpart STA, management action frames for setup or termination of the TDLS link, for example, TDLS frames must be exchanged through the legacy AP. However, a problem arises because the legacy AP cannot directly take part in the TDLS link, which is set up between two Non-AP STAs.

One of methods for solving the problem is to encaptulate the TDLS frames in data frame form and transmit the TDLS frames to the counterpart STA via the legacy AP. According to this method, the legacy AP only functions to relay communication between the Non-AP STAs, but is not engaged in procedures, such as setup, management and termination of the TDLS link. The embodiments of the present invention to be described later may be usefully applied to a TDLS wireless network in which TDLS frames, which are encaptulated in data frame form for the setup, termination, and management of a TDLS link as described above, are exchanged.

Of devices constituting the TDLS wireless network, a Non-AP STA is a specific device, including a physical layer interface between MAC (Medium Access Control) and a wireless medium according to the IEEE 802.11 standard. The Non-AP STA is a wireless device not an AP, and may be also referred to as a wireless transmit/receive unit (WTRU), a user equipment (UE), a mobile station (MS), a mobile subscriber unit or the like.

The Non-AP STA includes a processor and a transceiver, and may generally further include a user interface, display means and the like. The processor is a function unit configured to generate frames, which will be transmitted over a wireless network, or process frames received over the wireless network, and functions to control stations and process several signals, which are input by users and for users. Further, the transceiver is a unit, which is functionally coupled to the processor and configured to transmit/receive frames over a wireless network for stations.

Further, the Non-AP STA supports the PPSM in a TDLS wireless network, which will be described later on. Accordingly, a Non-AP STA that has set up a TDLS link to a counterpart Non-AP STA may operate in the PSM after negotiating information, such as wakeup times, with the counterpart Non-AP STA.

Further, an AP is a function entity, which has a radio station function and provides access to a distribution system (DS) via a radio medium for an associated station. According to the embodiments of the present invention, the AP may be a legacy AP that does not support the QoS, but may be a QAP that supports the QoS. This AP may be also referred to as a concentrated controller, a base station (BS), a node B, a site control or the like.

Figure 1:
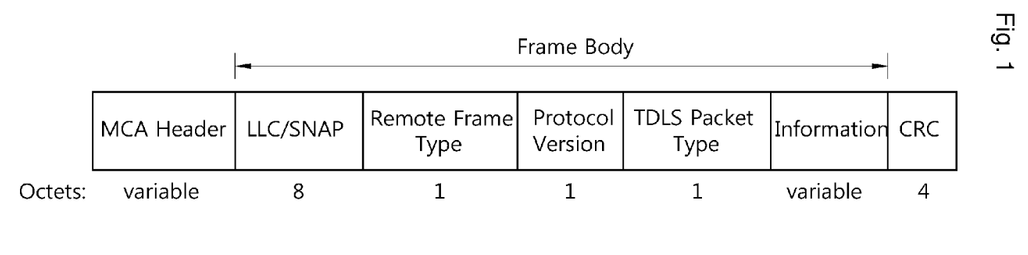
FIG. 1 is a block diagram showing the format of a medium access control (MAC) frame pertinent to a TDLS procedure.

FIG. 1 is a block diagram showing the format of a MAC frame (hereinafter referred to as a 'TDLS frame'), which is exchanged between a first Non-AP STA and a counterpart Non-AP STA (or peer STA) via a legacy AP in a TDLS wireless network. Referring to FIG. 1, the TDLS frame includes a MAC header field, a logical link control (LLC)/sub-network access protocol (SNAP) field, a remote frame type field, a TDLS packet type field, an information field, and a cyclic redundancy code (CRC) field. The TDLS frame may further include a protocol version field.

The MAC header field includes information, which is common to almost all types of frames. For example, the MAC header field may include a frame control field, a duration/ID field, a plurality of address fields (Address1, Address2, Address3, Address4), a sequence control field, a QoS control field and/or the like.

Of the fields, the frame control field includes a protocol version field, a type and subtype to identify the function of a frame, a more fragment field to indicate whether more fragments of a current MSDU or MMPDU exist, a retry field to indicate whether frames will be retransmitted, a power management field to indicate whether a station operates in the PSM, and so on. The power management field of the frame control field indicates a mode in which a STA operates after a series of frames are exchanged successfully. For example, when the power management field is set to '0', it indicates that the STA that transmits the frames operates in the AM (Active mode). When the power management field is set to '1', it indicates that the STA that transmits the frames operates in the PPSM (Peer Power Save Mode).

Further, the QoS control field functions to identify several pieces of QoS related information about frames, which vary depending on a traffic category (TC) to which frames belong or a traffic stream (TS) and a frame type and subtype. The QoS control field may exist in all TDLS frames in which the QoS subfield of a subtype field of a frame is set to '1'. Each QoS control field includes five subfields. Usage examples and several possible layouts of the subfields are listed in Table 1.

TABLE 1

| Applicable Frame (sub) Types | Bits 0-3 | Bit 4 | Bits 5-6 | Bit 7 | Bits 8-15 |
|---|---|---|---|---|---|
| QoS (+)CF-Poll frames sent by HC | TID | EOSP | Ack Policy | Reserved | TXOP limit |
| QoS Data, QoS Null, and QoS Data + CF-Ack frames sent by HC | TID | EOSP | Ack Policy | Reserved | AP PS Buffer State |
| QoS data frames sent by non-AP to an AP | TID | 0 | Ack Policy | Reserved | TXOP Duration Requested |
| | TID | 1 | Ack Policy | Reserved | Queue Size |
| QoS Data, QoS Null, and QoS Data + CF-Ack frames sent over the direct link | TID | EOSP | Ack Policy | Reserved | Reserved |

Referring to FIG. 1, the LLC/SNAP field includes a LLC/SNAP header. Further, the remote frame type field may be set to a value (for example, '2'), indicating a TDLS frame. The protocol version field may be set to a value, indicating the protocol version of a transmitted/received message.

The TDLS packet type field is set to a value to specify the type of a TDLS frame. The type of a TDLS frame includes a TDLS setup request frame, a TDLS setup response frame, a TDLS setup confirm frame, a TDLS Rx switch request frame, a TDLS Rx switch response frame, a TDLS peer traffic indication frame, a TDLS PPSM request frame, a TDLS PPSM response frame and so on.

The peer traffic indication frame is a frame, informing that data to be transmitted from an STA to a peer STA is buffered. The name 'peer traffic indication frame' is illustrative, and may be also referred to as a TDLS traffic indication message (TIM) frame, etc. Further, the PPSM request frame and the PPSM response frame are frames, which are exchanged in order to negotiate or update wakeup times, information of a channel, etc. before entering the PSM between the peer STAs that have set up a TDLS link between them.

Further, the information field of a TDLS frame also includes several pieces of information, which are individually specified according to the type of each TDLS frame. The included information differs depending on each TDLS type. Further, the cyclic redundancy correction (CRC) field includes supplementary information for the cyclic redundancy of a corresponding frame.

Figure 2:
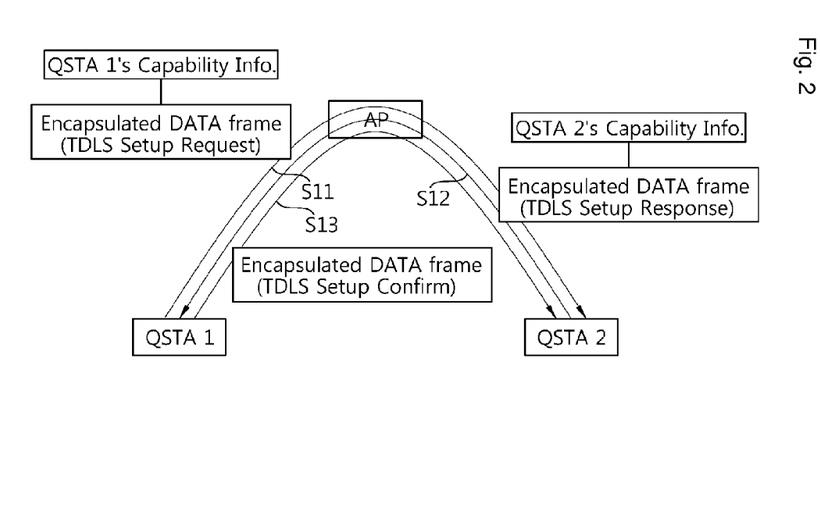
FIG. 2 is a message flowchart showing a TDLS procedure.

FIG. 2 is a message flowchart showing a TDLS procedure in a TDLS wireless network, including two Non-AP STAs (hereinafter simply referred to 'STAs') and a legacy AP.

Referring to FIG. 2, a first STA that tries to set up a direct link to a second STA sends a frame, for example, a TDLS setup request frame, which requests the setup of the direct link, to the second STA via an AP (S11). The TDLS setup request frame may be set to a value in which the TDLS packet type field indicates the TDLS setup request frame in the TDLS frame of FIG. 1. Accordingly, in the step S11, the TDLS setup request frame is encapsulated in data frame form and then transmitted. Accordingly, if a received frame is a TDLS setup request frame, the AP functions to transfer the frame to the second STA, that is, a receiving STA.

Figure 3:
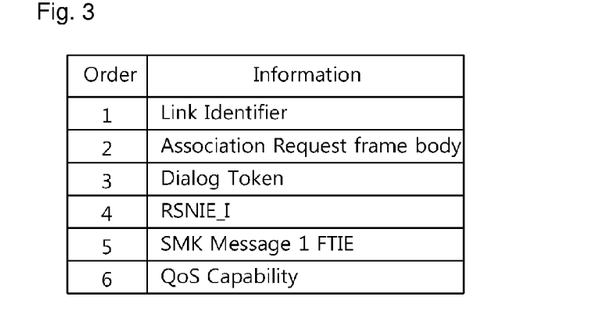
FIG. 3 is a table showing an example of information that can be included in a TDLS setup request frame.

FIG. 3 shows information included in the information field of the TDLS setup request frame (the information field in the TDLS frame of FIG. 1). Referring to FIG. 3, the information field of the TDLS setup request frame may further include link identifier information, association request frame body information, dialog token information, QoS capability information of the first STA, and so on. The information field of the TDLS setup request frame may further include capability information or extended capability information.

Figure 4:
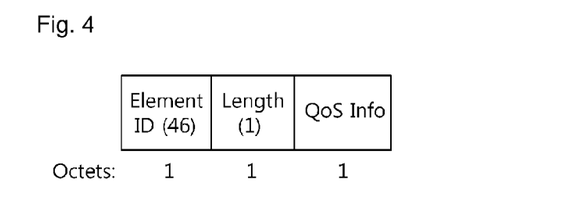
FIG. 4 is a block diagram showing the format of a QoS capability information element, which can be included in a TDLS setup request frame and a TDLS setup response frame.

FIG. 4 is a block diagram showing the format of the QoS capability information. The QoS capability information is used to inform the QoS capability supported by the first STA that transmits the QoS capability information. According to an embodiment of the present invention, a QoS capability information element is used by the first STA or the second STA, which enters the PPSM, in order to inform a peer QSTA of a trigger-enabled access category and/or a delivery-enabled access category supported by the first STA or the second STA. Referring to FIG. 4, the QoS capability information includes an element ID field, a length field, and a QoS information field.

Figure 5:
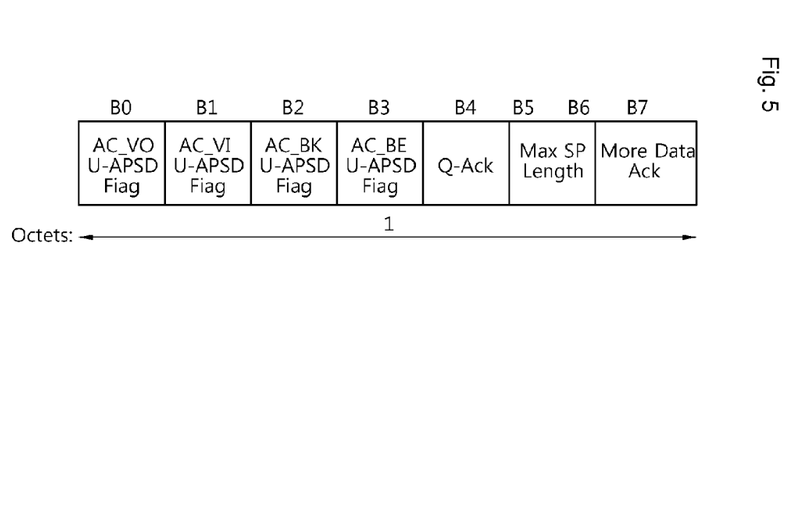
FIG. 5 is a block diagram showing the format of a QoS information field (QoS Info) shown in FIG. 4.

FIG. 5 is a block diagram showing an example of the format of the QoS information field shown in FIG. 4. Referring to FIG. 5, the QoS information field includes an AC_VO U-APSD flag bit, an AC_VI U-APSD flag bit, an AC_BK U-APSD flag bit, an AC_BE U-APSD flag bit, a Q-Ack bit, a max service period length (Max SP Length) bit, and a more data Ack bit. The information included in the QoS information field indicates a trigger-enabled access category and/or a delivery-enabled access category of an STA that transmits the information.

In the case in which, in the QoS information field, a U-APSD flag bit with respect to a specific access category is set to '1', the corresponding access category is set to a trigger-enabled access category or a delivery-enabled access category. However, in the case in which, in the QoS information field, a U-APSD flag bit with respect to a specific access category is set to '0', a data frame of the corresponding access category is transferred according to a general message transfer procedure not the U-APSD procedure. In other words, during a service period (SP), an STA being in the active mode or a PPSM AP mode is not allowed to transmit data irrespective of PS-poll. In the case in which an STA being in the PSM or a PPSM client mode sends PS-poll, an STA being in the PPSM AP mode can transmit data frames.

Figure 6:
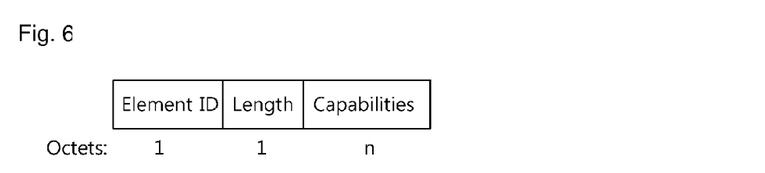
FIG. 6 is a block diagram showing the format of an extended capability information element, which can be included in a TDLS setup request frame and a TDLS setup response frame.

FIG. 6 is a block diagram showing the format of an extended capability information element, that is, one information element that may be included in the TDLS setup request frame. According to an embodiment of the present invention, the extended capability information may be used to indicate whether a first or second STA supports the PPSM. However, whether an STA supports the PPSM may be also included in an information element (for example, a capability information element), indicating the capabilities of the STA, or the above-described QoS capability information element, not the extended capability information element. Referring to FIG. 6, the extended capability information includes an element ID field, a length field, and a capability field. In this case, the capability field includes PPSM related mode information supported by a corresponding STA.

Referring back to FIG. 2, the second STA that has received the TDLS setup request frame transmits a TDLS setup response frame to the first STA via the AP in response thereto (S12). At this time, the TDLS setup response frame is set to a value in which, in the TDLS frame of FIG. 1, the TDLS packet type field indicates the TDLS setup response frame. Accordingly, the TDLS setup response frame is encapsulated in data frame form and then transmitted to the first STA via the AP.

Figure 7:
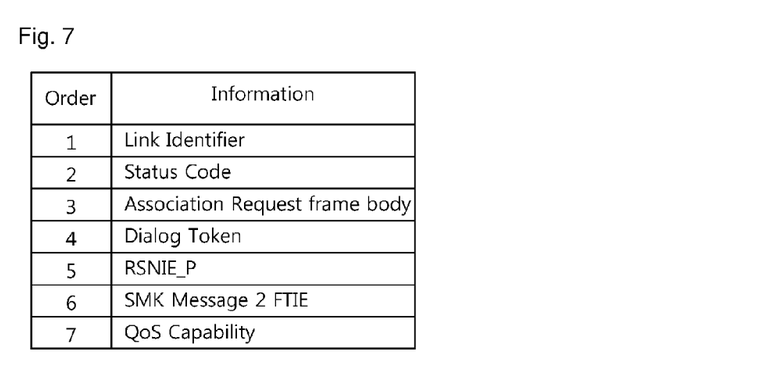
FIG. 7 is a table showing an example of information that can be included in a TDLS setup response frame.

FIG. 7 shows information included in the information field of the TDLS setup response frame (the information field in the TDLS frame of FIG. 1). Referring to FIG. 7, the information field of the TDLS setup response frame includes link identifier information, status code information, association request frame body information and dialog token information, and QoS capability information of a QSTA. The format of the QoS capability information is identical to that of FIG. 4, and a detailed description thereof is omitted. Further, the information field of the TDLS setup response frame may further include an information element, for example, an extended capability information element to indicate whether an STA, which transmits the information field, supports a PPSM AP mode and/or a PPSM client mode, in the same manner as the information field of the TDLS setup response frame.

Referring back to FIG. 2, the first STA transmits a TDLS setup confirm frame to the second STA via the AP in response to the received TDLS setup response frame (S13). The TDLS setup confirm frame is set to a value in which, in the TDLS frame of FIG. 1, the TDLS packet type field indicates the TDLS setup confirm frame. The TDLS setup confirm frame is encapsulated in data frame form and then transmitted to the second STA via the AP. In the TDLS procedure, management action frames are encapsulated in data frame form and then transmitted without an AP's direct participation. Accordingly, there is a high possibility that the management action frames may be lost during transmission. For this reason, in the TDLS procedure, in response to a TDLS setup response frame from a peer STA (second STA), an initial STA (first STA) transmits a TDLS setup confirm frame.

As described above, after the TDLS setup request frame, the TDLS setup response frame, and the TDLS setup confirm frame are exchanged between the first STA and the second STA, a TDLS link is set up and completed between the first STA and the second STA. When the TDLS link is set up between the two STAs, the first STA and the second STA can exchange data, other management frames, etc. through the TDLS link path without passing through the AP. The first STA and the second STA may also communicate with each other through an AP path.

Further, according to an embodiment of the present invention, any one STA that has set up a TDLS link may enter the PSM. In this case, two peer STAs between which the TDLS link has been set up are STAs which both support the PPSM. Further, in the case in which any one of the two peer STAs tries to enter the PSM, the corresponding STA may maintain the TDLS link without change. Further, a peer STA that tries to enter the PSM may negotiate a wakeup schedule, etc. with the other peer STA before entering the PSM.

A procedure for the PPSM in a direct setup wireless network according to an embodiment of the present invention is described below.

Figure 8:
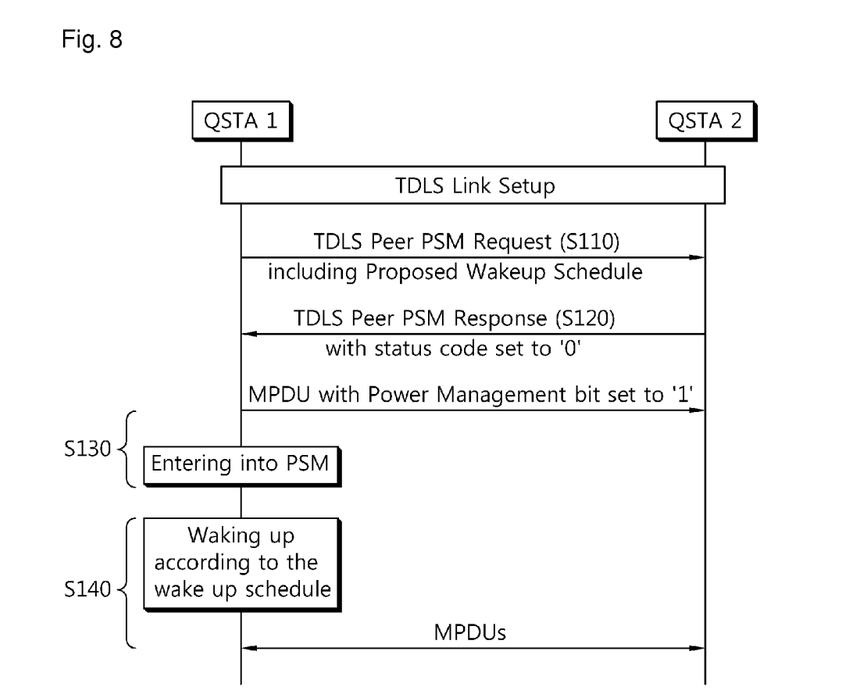
FIG. 8 is a message flowchart showing a procedure for a PPSM according to an embodiment of the present invention.

FIG. 8 is a message flowchart showing a procedure for the PPSM according to an embodiment of the present invention.

Referring to FIG. 8, a first QSTA (QSTA1) and a second QSTA (QSTA2) have set up a TDLS link therebetween. A procedure for the PPSM according to the present embodiment may employ, as described above, the 3-way handshake, that is, the exchange of a TDLS setup request frame, a TDLS setup response frame, and a TDLS setup confirm frame between the first QSTA and the second QSTA. However, the present embodiment is not limited thereto.

Further, a QSTA that tries to enter the PPSM, of the first QSTA and the second QSTA, which have set up the TDLS link therebetween, for example, the first QSTA transmits a request message, including schedule information such as proposed wakeup schedule information, to a counterpart QSTA, for example, the second QSTA (S110). Here, the schedule information includes information about a wakeup schedule in which a QSTA that has entered the PPSM tries to switch to the active mode (AM), information about a channel to be used in the active mode, and so on. The request message, including such schedule information, may be transmitted to the second QSTA through a direct path or an AP path.

The request message may be, for example, a TDLS PPSM request frame, which is only illustrative. The TDLS PPSM request frame may employ a TDLS frame having the format shown in FIG. 1. Further, the TDLS PPSM request frame may include dialog token information, link identifier information, wakeup schedule information, and so on.

Of them, the wakeup schedule information is an example of the schedule information. The wakeup schedule information includes information associated with a wakeup schedule for the PPSM. For example, the wakeup schedule information element may include an element ID field, a length field, a start time field, an interval field, a minimum duration field, and an idle count field. The element ID field may be set to a value, indicating that it is a wakeup schedule information element. The length field may be set to a value, indicating the entire length of fields following the length field in the information element. Further, the start time field may be set to a specific value, indicating the start of a first wakeup duration. The interval field may be set to a value, indicating the distance between two consecutive wakeup durations. Further, the minimum duration field may be set to a value, indicating the minimum duration of a wakeup duration. The idle count field may be set to a value, indicating the number of consecutive empty wakeup durations before a peer STA activates the wakeup schedule.

The second QSTA, which has received the request message, transmits a response message to the first QSTA (S120). In the case in which the request message is a PPSM request frames, the response message may be a PPSM response frame. Further, the PPSM response frame may be transmitted to the first QSTA through a direct link or an AP path.

The response message includes information (for example, status code information), indicating whether the second QSTA has accepted the schedule information proposed by the first QSTA. Further, in the case in which the status code information indicates unacceptability, the response message may include other schedule information, that is, schedule information such as a wakeup schedule wanted by the second QSTA. In the case in which new schedule information is included in the response message, in the flowchart of FIG. 8, a process in which the first QSTA transmits a response message to the second QSTA may be added. Hereinafter, a case in which the status code information included in the response message is set to a value, indicating acceptability of the proposal, for example, '0' is described.

Next, the first QSTA that has received the response message whose status code is set to '0' may transmit a MPDU whose power management bit is set to '1' to the second QSTA and then enter the PSM (S130). In this case, the second QSTA may also transmit a MPDU whose power management bit is set to '1' to the first QSTA and then enter the PSM.

Further, the first QSTA that has entered the PSM (or also include the second QSTA in the case in which the second QSTA has entered the PSM) switches to the active mode according to the schedule information (for example, the wakeup schedule) negotiated with the first QSTA. Further, the first QSTA that has entered the active mode communicates with the second QSTA, while maintaining the wakeup state during a specific duration in the schedule information. As described above, what the first QSTA switches to the active mode may be repeated during a specific duration in the schedule information.

Figure 9:
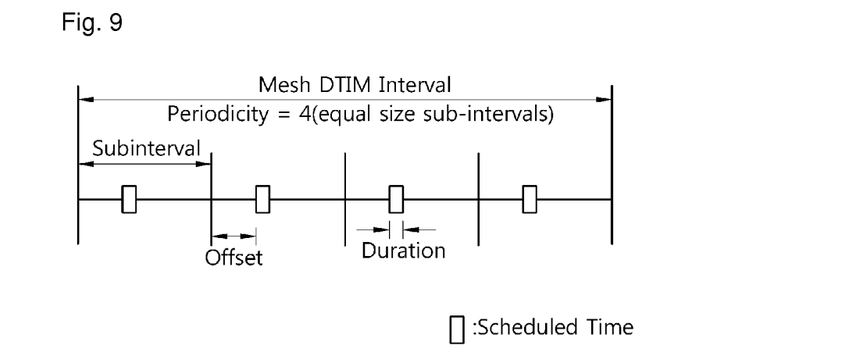
FIG. 9 is a diagram showing a method of specifying the access time of a wireless resource for frame transmission according to a schedule through a direct link according to an embodiment of the present invention.

FIG. 9 is a diagram showing an example of a method of specifying a wakeup schedule, that is, one of several pieces of schedule information in the procedure for TDLS according to an embodiment of the present invention, which has been described with reference to FIG. 8.

Referring to FIG. 9, a schedule for a wakeup schedule may be drawn up at specific time intervals. The time interval may be, for example, a DTIM (Delivery Traffic Indication Message) interval, but not limited thereto. Further, a detailed scheduled time during the time interval may be specified using three elements, including offset, duration, and periodicity. The offset indicates how far is a scheduled time off from a DTIM start time, the duration indicates the time when wireless resources are consecutively scheduled from an offset start time, and the periodicity indicates how many will the time interval be divided into several sub periodicities. The offset and the duration are used by a sub duration unit.

Figure 10:
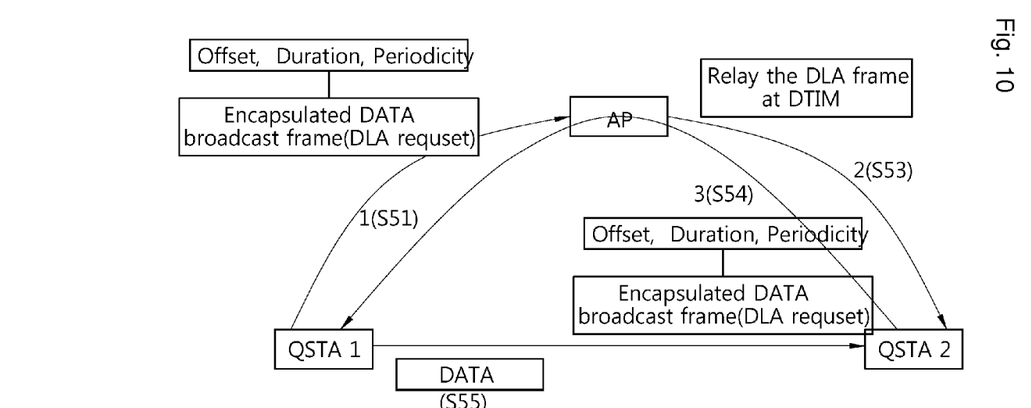
FIG. 10 is a schematic diagram showing a procedure in which a first QSTA (QSTA1) transmits data to a second QSTA (QSTA2) along a TDLS path at a scheduled time according to an embodiment of the present invention.
Figure 11:
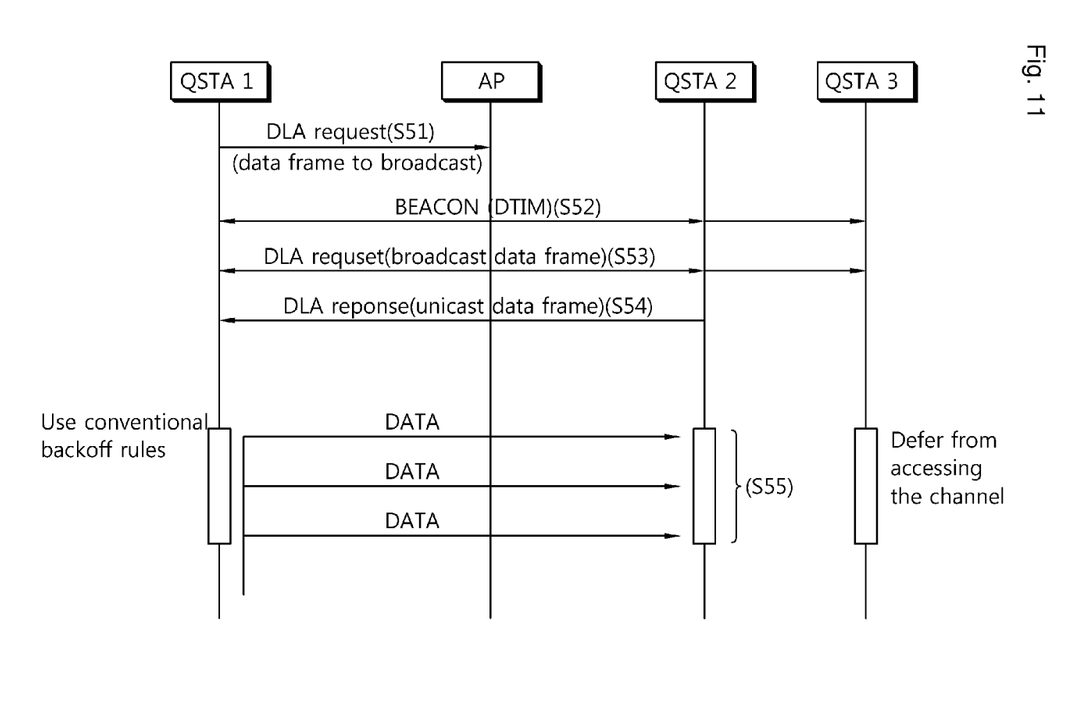
FIG. 11 is a diagram showing the example of a message flowchart corresponding to the schematic diagram of FIG. 10.

FIGS. 10 and 11 are a schematic diagram and a message flowchart, showing the example of a procedure in which a first QSTA (QSTA1) transmits data to a second QSTA (QSTA2) through a TDLS path at a scheduled time.

First, the first QSTA transmits a message requesting a direct link announcement (DLA), that is, a DLA request frame to an AP (S51). The type of the DLA request frame has nothing limit. For example, the DLA request frame may be a new type of a TDLS management action frame (for example, a TDLS DLA request frame, that is, a TDLS type value '9') or a type in which a field, including such information, is added to an already known type of the TDLS management action frame. This DLA request message may be encaptulated in data frame form and then transmitted to the AP, in the same manner as other TDLS management action frame, but not limited thereto.

The DLA request frame includes information about the scheduled time of a wireless resource for which the first QSTA wants to draw up a schedule in order to transmit data frames through a direct link. According to an embodiment, the DLA request frame may include information about a counterpart QSTA that has set up TDLS.

For example, information about a scheduled time for channel access, included in the DLA request frame, may include offset information, duration information, and periodicity information as described above with reference to FIG. 9. Further, the information about the counterpart QSTA may include a MAC address of the counterpart QSTA, identifier information of TDSL, and so on.

Next, the AP that has received the DLA request frame from the first QSTA periodically transmits a beacon frame (S52). The beacon frame may be transmitted, for example, at TIM intervals or DTIM (Delivery traffic Indication Message) intervals.

The AP then transmits a DLA request frame, which is included in the beacon frame or included separately from the beacon frame, at the same DTIM interval as that of the beacon frame or at a different DTIM interval from that of the beacon frame (S53). In the case of the latter, the DLA request frame may be encaptulated in data frame form and then transmitted. Further, according to an embodiment of the present invention, the DLA request frame is not transmitted in unicast form, but in broadcast form. As described above, since the AP transmits the DLA request frame in broadcast form, all STAs, which are associated with the time information, etc. about the wireless resource to be scheduled, for example, not only the first QSTA and the second QSTA of FIG. 11, but also a third QSTA (QSTA3) can be informed of the schedule information of the wireless resource.

If the DLA request frame transmitted in broadcast form is received, a counterpart QSTA to be scheduled, that is, the second QSTA transmits a response frame to the first QSTA in response to the received DLA request frame (S54). The response frame may be, for example, a DLA response frame, and includes information, indicating acceptability about the received request, and the same information (offset information, duration information, periodicity information, etc.) as the information included in the received DLA request frame. If the second QSTA wants to reject the received request, it may transmit the DLA response frame, further including reasons for the rejection and modified time information (offset information, duration information, periodicity information, etc.) about the scheduled time.

This DLA response frame can be transmitted to only the first QSTA in unicast form via a direct link or the AP. In the case in which the DLA response frame is transmitted via the AP, the DLA response frame may be defined as a new type of a TDLA action frame, encaptulated in data frame form and then transmitted. Alternatively, according to an embodiment, response results may be transferred to the first QSTA via the AP in broadcast form. In the case of the latter, the DLA response frame functions to inform neighboring MPs of the scheduled time information of the wireless resource once again.

As described above, after the transmission of the DLA request frame, the broadcasting of the DLA request frame, and the transmission of the DLA response frame are sequentially finished, the first QSTA sequentially transmits the buffered data frames through a direct link at a scheduled time (S55). A procedure in which the first QSTA transmits the buffered data frames is not specially limited, and may employ the typical back-off rules in communication employing the WLAN. Further, at the scheduled time announced by the DLA request frame, neighboring QSTAs, for example, a third QSTA defers accessing a corresponding channel, and so the direct link between the first QSTA and the second QSTA can be protected.

Figure 12:
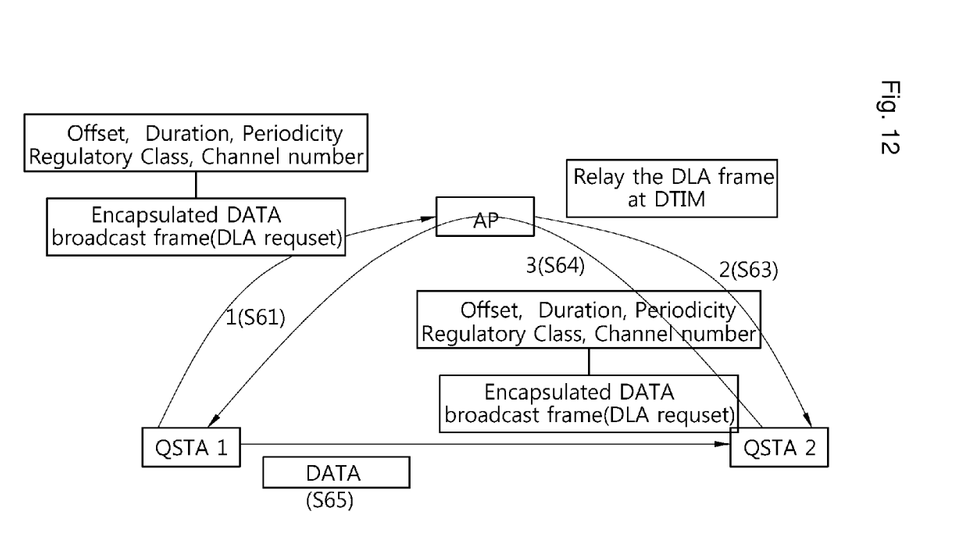
FIG. 12 is a schematic diagram showing a procedure in which a first QSTA (QSTA1) transmits data to a second QSTA (QSTA2) along a TDLS path at a scheduled time according to another embodiment of the present invention.
Figure 13:
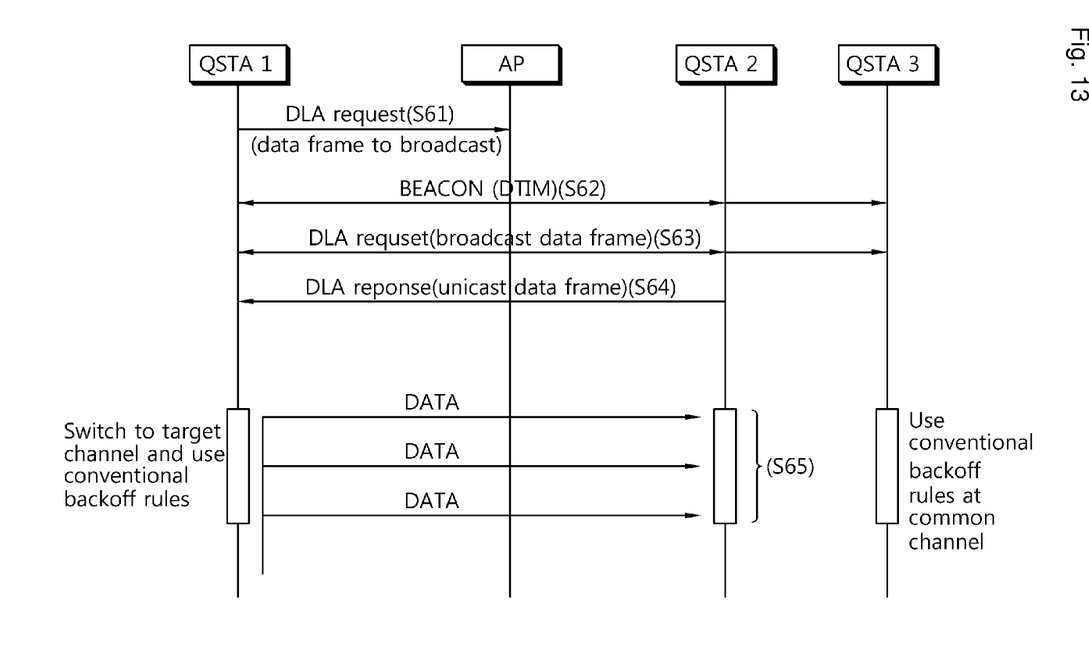
FIG. 13 is a diagram showing the example of a message flowchart corresponding to the schematic diagram of FIG. 12.

FIGS. 12 and 13 are a schematic diagram and a message flowchart, showing the example of a procedure in which a first QSTA (QSTA1) transmits data to a second QSTA (QSTA2) through a TDLS path at a scheduled time and through an off channel.

First, the first QSTA transmits a message requesting a direct link announcement (DLA), that is, a DLA request frame to an AP (S61). The type of the DLA request frame has nothing limit. For example, the DLA request frame may be a new type of a TDLS management action frame (for example, a TDLS DLA request frame, that is, a TDLS type value '9') or a type in which a field, including such information, is added to an already known type of the TDLS management action frame. This DLA request message may be encaptulated in data frame form and then transmitted to the AP, in the same manner as other TDLS management action frame, but not limited thereto.

The DLA request frame includes information about the scheduled time of a wireless resource for which the first QSTA wants to draw up a schedule in order to transmit data frames through a direct link. According to an embodiment, the DLA request frame may include information about a counterpart QSTA that has set up TDLS. For example, information about a scheduled time for channel access, included in the DLA request frame, may include offset information, duration information, and periodicity information as described above with reference to FIG. 9. Further, the information about the counterpart QSTA may include a MAC address of the counterpart QSTA, identifier information of TDSL, and so on.

The DLA request frame may further include information about an off channel, which will be used at the time of data transmission through a direct link, for example, information about a regulatory class together with a channel number. The channel number refers to a channel different from a channel that is now used, and is ID information, indicating a channel that is wanted by the first QSTA when the first QSTA transmits data to the second QSTA through the direct link. Further, the regulatory class information is an index, indicating a set of values for a radio equipment set having specific rules.

Next, the AP that has received the DLA request frame from the first QSTA periodically transmits a beacon frame (S62). The beacon frame may be transmitted, for example, at TIM intervals or DTIM (Delivery traffic Indication Message) intervals.

The AP then transmits a DLA request frame, which is included in the beacon frame or included separately from the beacon frame, at the same DTIM interval as that of the beacon frame or at a different DTIM interval from that of the beacon frame (S63). In the case of the latter, the DLA request frame may be encaptulated in data frame form and then transmitted. Further, according to an embodiment of the present invention, the DLA request frame is not transmitted in unicast form, but in broadcast form. As described above, since the AP transmits the DLA request frame in broadcast form, all STAs, which are associated with the time information, etc. about the wireless resource to be scheduled, for example, not only the first QSTA and the second QSTA of FIG. 13, but also a third QSTA (QSTA3) can be informed of the schedule information of the wireless resource.

If the DLA request frame transmitted in broadcast form is received, a counterpart QSTA to be scheduled, that is, the second QSTA transmits a response frame to the first QSTA in response to the received DLA request frame (S64). The response frame may be, for example, a DLA response frame, and includes information, indicating whether to accept or not the received request, and the same information (offset information, duration information, periodicity information, channel number information, and regulatory class information) as the information included in the received DLA request frame. If the second QSTA wants to reject the received request, it may transmit the DLA response frame, further including reasons for the rejection and information of a modified proposal about a scheduled time (offset information, duration information, and periodicity information) and/or a channel to be used.

This DLA response frame may be transmitted to only the first QSTA in unicast form via a direct link or the AP (encaptulated in data frame form). Alternatively, according to an embodiment, response results may be transferred to the first QSTA via the AP in broadcast form. In the case of the latter, the DLA response frame functions to inform neighboring MPs of the scheduled time information of the wireless resource once again.

As described above, after the transmission of the DLA request frame, the broadcasting of the DLA request frame, and the transmission of the DLA response frame are sequentially finished, the first QSTA sequentially transmits the buffered data frames through a reserved channel (it is therefore necessary to switch to another channel) at a scheduled time (S65). A procedure in which the first QSTA transmits the buffered data frames is not specially limited, and may employ the typical back-off rules in communication employing the WLAN. Further, at the scheduled time announced by the DLA request frame, neighboring QSTAs, for example, a third QSTA defers accessing a corresponding channel, and so the direct link between the first QSTA and the second QSTA can be protected. However, the third QSTA, etc. may transmit frames according to a typical back-off procedure in an existing channel.

The embodiments of the present invention described above in detail are only illustrative in order to describe the technical spirit of the present invention. Therefore, the technical spirit of the present invention should not be construed to be limited by the embodiments. Therefore, the scope of the present invention is defined by the appended claims.

The present invention may be employed in communication protocols and stations related to WLAN.

The invention claimed is:

1. A method for transmission in a wireless local area network, the method comprising:

setting up a tunneled direct link setup (TDLS) direct link between a first station and a second station by transmitting a TDLS setup request frame including a link identifier indicating the TDLS direct link via an access point (AP) to the second station, receiving a TDLS setup response frame including the link identifier from the second station via the AP in response to the TDLS setup request frame, and transmitting a TDLS setup confirm frame to the second station via the AP in response to the TDLS setup response frame;

transmitting, by the first station, a TDLS peer Power Save Mode request frame including the link identifier via the AP to the second station in order to setup or change a wakeup schedule on the TDLS direct link, the TDLS peer Power Save Mode request frame including the wakeup schedule, wherein the TDLS peer Power Save Mode request frame is encapsulated in data frames, wherein the wakeup schedule is determined by power save mode parameters including an offset indicating a start of a first wakeup duration, a duration indicating a duration of a wakeup duration, and a periodicity indicating interval between two consecutive wakeup durations, wherein the power save mode parameters are used for the first station when the first station enters a power save mode; and receiving, by the first station, a TDLS peer Power Save Mode response frame from the second station in response to the TDLS peer Power Save Mode request frame, the response frame indicating whether the wakeup schedule in the TDLS peer Power Save Mode request frame is accepted or rejected by the second station, wherein the TDLS peer Power Save Mode response frame is encapsulated in data frames.

2. The method of claim 1, wherein the TDLS peer Power Save Mode response frame includes a modified wakeup schedule when the TDLS peer Power Save Mode response frame indicates a rejection of the wakeup schedule in the TDLS peer Power Save Mode request frame.

3. The method of claim 1, further comprising:

entering, by the first station, the power save mode based on the wakeup schedule when the TDLS peer Power Save Mode response frame indicates an acceptance of the wakeup schedule in the TDLS peer Power Save Mode request frame.

4. An apparatus in a wireless local area network, wherein the apparatus is configured to:

set up a tunneled direct link setup (TDLS) direct link with a peer station by transmitting a TDLS setup request frame including a link identifier indicating the TDLS direct link via an access point (AP) to the peer station, receiving a TDLS setup response frame including the link identifier from the peer station via the AP in response to the TDLS setup request frame, and transmitting a TDLS setup confirm frame to the peer station via the AP in response to the TDLS setup response frame;

transmit a TDLS peer Power Save Mode request frame including the link identifier via the AP to the peer station in order to setup or change a wakeup schedule on the TDLS direct link, the direct TDLS peer Power Save Mode request frame including the wakeup schedule, wherein the TDLS peer Power Save Mode request frame is encapsulated in data frames, wherein the wakeup schedule is determined by power save mode parameters including an offset indicating a start of a first wakeup duration, a duration indicating a durations, of a wakeup duration, and a periodicity indicating interval between two consecutive wakeup durations, wherein the power save mode parameters are used for the apparatus when the apparatus enters a power save mode; and receive a TDLS peer Power Save Mode response frame from the peer station in response to the TDLS peer Power Save Mode request frame, the response frame indicating whether the wakeup schedule in the TDLS peer Power Save Mode request frame is accepted or rejected by the peer station.

5. The apparatus of claim 4, wherein the TDLS peer Power Save Mode response frame includes a modified wakeup schedule when the TDLS peer Power Save Mode response frame indicates a rejection of the wakeup schedule in the TDLS peer Power Save Mode request frame.

6. The apparatus of claim 4, wherein the apparatus is further configured to enter the power save mode based on the wakeup schedule when the TDLS peer Power Save Mode response frame indicates an acceptance of the wakeup schedule in the TDLS peer Power Save Mode request frame.

* * * * *